(12) United States Patent
Siegal

(10) Patent No.: US 8,764,362 B2
(45) Date of Patent: *Jul. 1, 2014

(54) PUSH-ON BOLT STABILIZER

(71) Applicant: HCC Holdings, Inc., Cleveland, OH (US)

(72) Inventor: David M. Siegal, Franklin Lakes, NJ (US)

(73) Assignee: HCC Holdings, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/763,843

(22) Filed: Feb. 11, 2013

(65) Prior Publication Data
US 2013/0216327 A1    Aug. 22, 2013

Related U.S. Application Data

(63) Continuation of application No. 13/083,100, filed on Apr. 8, 2011, now Pat. No. 8,371,784, which is a continuation of application No. 12/401,913, filed on Mar. 11, 2009, now Pat. No. 7,950,886, which is a continuation of application No. 10/205,805, filed on Jul. 26, 2002, now abandoned.

(51) Int. Cl.
F16B 39/00    (2006.01)

(52) U.S. Cl.
USPC ........... 411/107; 411/353; 411/431; 411/433; 411/436; 411/437; 411/525; 411/526; 411/538

(58) Field of Classification Search
USPC ......... 411/107, 353, 431, 433, 436, 437, 525, 411/526, 538
See application file for complete search history.

(56) References Cited

U.S. PATENT DOCUMENTS

| | | | |
|---|---|---|---|
| 1,421,628 | A | 7/1922 | Wheeler |
| 1,805,816 | A | 5/1931 | Fleming |
| 2,096,387 | A | 10/1934 | Tinnerman |
| 2,063,181 | A | 12/1936 | Miller |
| 2,190,532 | A | 2/1940 | Lukomski |
| 2,222,807 | A | 11/1940 | Burr |
| 2,266,049 | A | 12/1941 | Kost |
| 2,378,957 | A | 6/1945 | Tinnerman |
| 2,398,374 | A | 4/1946 | Hartman |
| 2,401,672 | A | 6/1946 | Tinnerman |
| 2,410,995 | A | 11/1946 | Olson, Jr. |

(Continued)

OTHER PUBLICATIONS

Office Action from Canadian Patent Application No. 2,428,221 dated Feb. 27, 2006.

(Continued)

Primary Examiner — Roberta Delisle
(74) Attorney, Agent, or Firm — Calfee Halter & Griswold LLP

(57) ABSTRACT

The invention provides for a retainer for stabilizing a threaded member. The retainer may include a base portion having an opening and an outer perimeter lying in a first plane, the opening having a plurality of elongated sections each extending toward the outer perimeter so as to define in the base portion one or more arms. Each of the aims may have a head section having at least one groove, the head sections being located in a second plane which is parallel to and spaced apart from the first plane. The elongated sections may be symmetrically arranged about an axis. The grooves may be arranged to define at least a portion of a helix. The outer perimeter of the retainer may be circular.

14 Claims, 6 Drawing Sheets

(56) References Cited

U.S. PATENT DOCUMENTS

| | | |
|---|---|---|
| 2,492,115 A | 12/1949 | Crowther |
| 2,709,470 A | 5/1955 | Knohl |
| 2,712,262 A | 7/1955 | Knohl |
| 2,726,101 A | 12/1955 | Peterson |
| 2,855,013 A | 10/1958 | Lillard |
| 2,975,667 A | 3/1961 | Bross |
| 3,062,557 A | 11/1962 | Underwood |
| 3,099,456 A | 7/1963 | Hopp |
| D198,713 S | 7/1964 | Curtiss |
| 3,283,639 A | 11/1966 | Holton |
| 3,362,737 A | 1/1968 | Cobb |
| 3,419,298 A | 12/1968 | Worley |
| 3,476,165 A | 11/1969 | Vaughn |
| 4,139,038 A | 2/1979 | Haussermann |
| 4,207,632 A | 6/1980 | Savell, Jr. et al. |
| 4,257,892 A | 3/1981 | Boersma |
| 4,757,662 A | 7/1988 | Gasser |
| 4,911,594 A | 3/1990 | Fisher |
| 4,990,044 A | 2/1991 | Kimak |
| 5,056,975 A | 10/1991 | Ando |
| 5,112,178 A | 5/1992 | Overhues et al. |
| 5,188,441 A | 2/1993 | Rubel |
| 5,376,264 A | 12/1994 | Betancourt |
| 5,599,131 A | 2/1997 | Julen et al. |
| 5,628,587 A | 5/1997 | Lesslie |
| 6,125,479 A | 10/2000 | Fraleigh |
| 6,132,153 A | 10/2000 | LeVey et al. |
| 6,554,555 B2 | 4/2003 | Imahigashi |
| 6,669,419 B1 | 12/2003 | Fleetwood |
| 6,698,986 B2 | 3/2004 | Fraleigh |
| 6,705,813 B2 | 3/2004 | Schwab |
| 7,207,762 B2 | 4/2007 | Teal |
| 7,462,007 B2 | 12/2008 | Sullivan et al. |
| 7,553,178 B1 | 6/2009 | Wertz et al. |
| 7,686,554 B2 | 3/2010 | Amann et al. |
| 7,950,886 B2 | 5/2011 | Siegal |
| 2001/0008600 A1 | 7/2001 | Fraleigh |
| 2004/0016046 A1 | 1/2004 | Siegal |
| 2005/0095085 A1 | 5/2005 | Winker |
| 2006/0283792 A1 | 12/2006 | McCallum |

OTHER PUBLICATIONS

Office Action from Canadian Patent Application No. 2,428,221 dated Apr. 25, 2008.

International Search Report and Written Opinion of the International Searching Authority from International Application No. PCT/US2013/022713, date of mailing Mar. 22, 2013.

Office Action from Canadian Patent Application No. 2,428,221 dated Jul. 11, 2007.

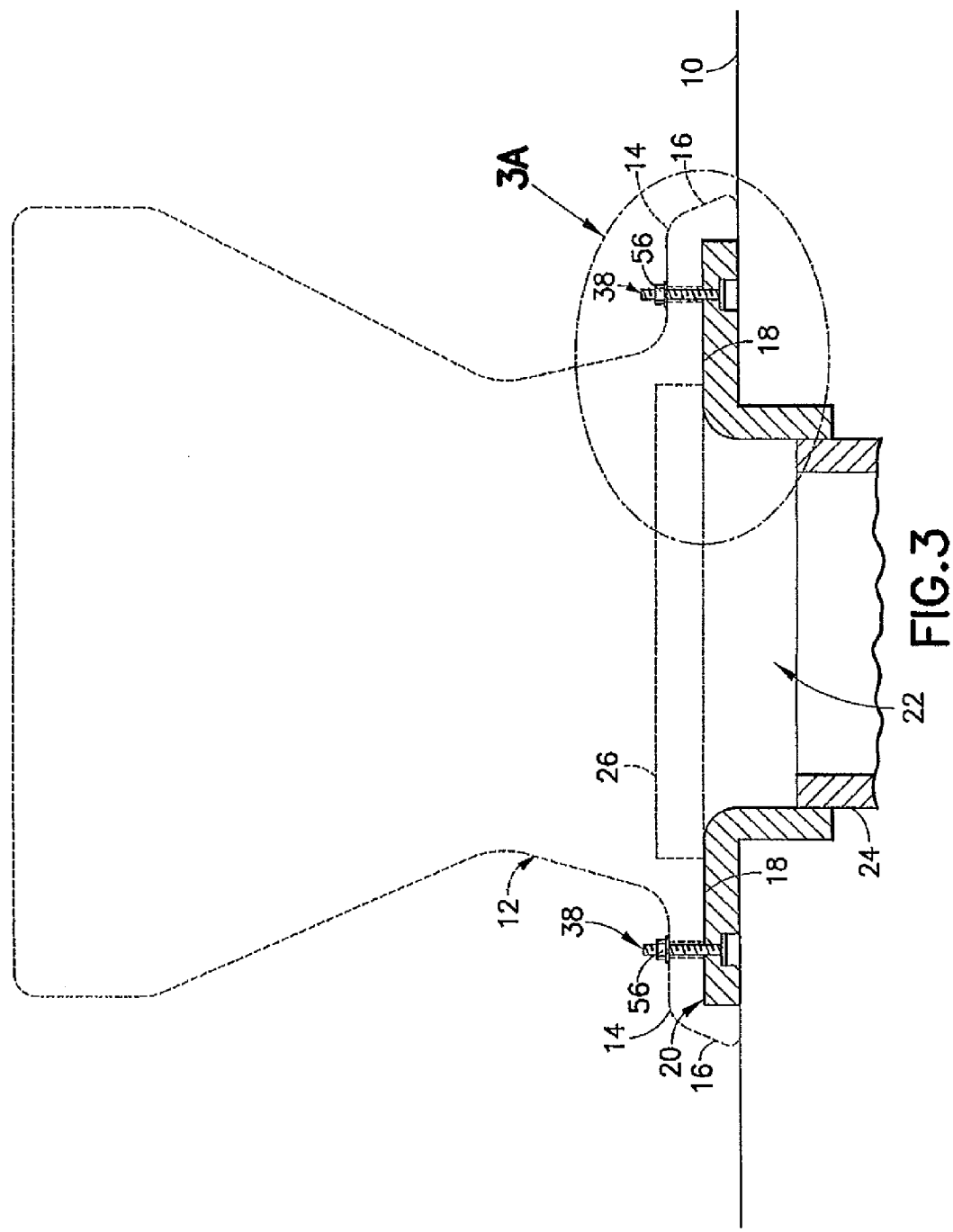

PUSH-ON BOLT STABILIZER

CROSS-REFERENCE TO RELATED APPLICATIONS

This application is a continuation application under 35 U.S.C. §120 of U.S. patent application Ser. No. 13/083,100, entitled PUSH-ON BOLT STABILIZER, filed on Apr. 8, 2011, now U.S. Pat. No. 8,371,784, which is a continuation of application Ser. No. 12/401,913, entitled PUSH-ON BOLT STABILIZER, filed on Mar. 11, 2009, now U.S. Pat. No. 7,950,886 which is a continuation of U.S. patent application Ser. No. 10/205,805, entitled PUSH-ON BOLT STABILIZER, filed on Jul. 26, 2002, the entire disclosures of which are hereby incorporated by reference herein.

FIELD OF THE INVENTION

The present invention is directed generally to toilet bolts.

BACKGROUND OF THE INVENTION

One of the most common ways to hold a toilet seat to the floor is with a bolt. See U.S. Pat. No. 6,125,479, the contents of which are incorporated by reference.

When using a nut and bolt fastener it is almost always the practice to provide the objects being joined with a bore through which the bolt body extends. Bolt insertion into the bore is facilitated by making the bore somewhat larger than the bolt's diameter.

As the diameter of the bore increases relative to the diameter of the bolt, and the thickness of the bore decreases relative to the length of the bolt body, the bolt becomes more prone to shifting its position in the bore before the nut is tightened. Such movement of the bolt may thwart or at least complicate attachment and tightening of the nut and proper positioning of the bolt and object being attached. Moreover, in certain types of installations, such as those described below involving toilets, the bolt may even drop out of the bore. Thus, there exists a general need for a device which helps to stabilize and position a bolt for a toilet.

Toilets typically have universally accepted components for mounting on a floor surface. The toilet has a horizontal base to rest on and engage the floor surface. A recess opening appears on the underside thereof with a perimeter. A floor ring already mounted in the floor, is fitted within the recess. The floor ring is in communication with the downwardly extending sewer pipe.

A pair of oppositely disposed slots are typically formed in the flange and comprise a wide bolt head receiving portion terminating in an elongated narrow bolt head retaining portion slots. These openings extend vertically through the flange. The narrow portion of the slot frequently has lower edges terminating in a groove extending along the edges. The groove has a width greater than the narrow portion of the slot.

Conventionally, a bolt which has tipper and lower ends with the lower end having a planar head is mounted within the narrow portion of the slot with the planar head on the lower end thereof positioned in the aforementioned groove. The planar head on the bolt has a width wider than the narrow portion of the slot, and a longitudinal length greater than the width of the narrow portion. The longitudinal length of the head has a center axis which is typically positioned by turning the bolt so that the center axis extends across the width of the narrow portion of the slot.

A potential problem with the conventional configuration is that it is difficult to stabilize the bolt in the flange slot as the toilet is lowered. Since it is very difficult for the installer to see the bolts and to hold the toilet in place as the toilet is lowered over the upwardly pointing bolts, the bolts can be accidentally knocked out of position when the toilet is lowered over the bolts. Such bolts can be lost below the floor surface.

One existing scheme for restraining toilet bolts during pedestal installations uses a loose floating washer. While advantageous for holding the bolt in the flange, the configuration does not keep the bolt fixed, to make slipping the bore over the bolt easier. Another conventional system uses a thin flat plastic washer with a circular central opening, and four small notches symmetrically arranged about the disk's center. These notches define four flexible tabs which can retain the washer over the bolt threads. This configuration has also not been found to securely hold the bolt in place as a porcelain toilet is being lowered thereon. If the bottom of the toilet hits the top of the bolt as it is being lowered, it could force the bolt through the washer and into the floorboard.

The construction does not reliably hold the bolt securely enough in the slot to prevent it from being knocked out of position when the toilet is lowered.

Accordingly, it is an object of the invention to provide an improved article and method for securing toilets to flanged rings.

SUMMARY OF THE INVENTION

Generally speaking, in accordance with the invention, a mounting bolt system for use in mounting toilets to flanges is provided. The system includes a bolt with upper and lower ends with an elongated threaded shank therebetween. An elongated planar head is on the lower end of the bolt, and a longitudinal length larger than the diameter of the shank. The head has a center axis extending along its length. A threaded push-on ring retainer is included to make a tight connection between the bolt head and the floor flange to hold the bolt securely enough that it will hold its position as the toilet is lowered. The ring is of a suitable diameter for convenient hand turning and is constructed of a flexible resilient material with the center or hub section sufficiently thick in depth to allow for a threaded opening to be in the center. The outer edge of the push-on retaining ring is provided with raised points or knobs to facilitate turning. The push-on retaining ring is constructed so that it can be easily pushed over the bolt threads and snugged tight with a minimal amount of turning. The internal threads in the center or hub of the ring allow it to be tightened in order to hold the fastening device in the proper position.

The retainer ring can include a base portion for contacting the upper surface of the flange, having an opening and an outer perimeter lying in a first plane, the opening having a plurality of independently movable elongated sections, each extending inwardly from the outer perimeter towards the center so as to define in the base portion one or more fingers. Each of the fingers may have a gripping section having at least one ridge for engaging the bolt threads, the gripping sections being located in a second plane which is parallel to and spaced above the first plane.

The retainer may be pushed onto a bolt to its final position for retaining a bolt, or near its final position. The retainer may then be rotated and screwed with minimal turning onto the bolt to further secure the bolt, the retainer should be sufficiently sturdy such that it can hold the bolt securely enough during toilet installation.

Because the fingers flex away from the slot as the retainer is slid into place, wear on the threads and grooves of the bolt and the retainer may be minimized during sliding of the retainer. Accordingly, once the retainer is positioned close to its final position, it may be rotated, with the grooves on the groove or grooves on the head section of the arms providing a threaded connection with the threaded bolt.

BRIEF DESCRIPTION OF THE DRAWINGS

In the drawing figures, which are merely illustrative, and wherein like reference characters denote similar elements throughout the several views:

FIG. 3 is a sectional view taken on line 3-3 of FIG. 2;

DESCRIPTION OF THE EXEMPLARY EMBODIMENTS

Figure 3A:
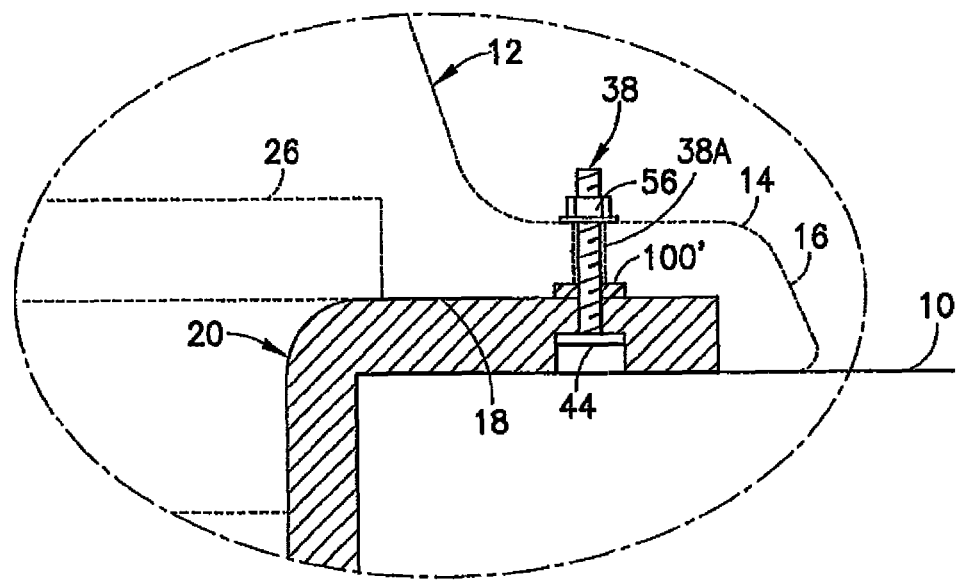
FIG. 3A is an enlarged scale sectional view taken on line 3A-3A of FIG. 3.

Referring generally to FIG. 3, a conventional floor surface 10 is shown supporting a conventional toilet 12 having a base 14, a perimeter portion 16, and a centrally located recess 18 in the bottom central portion thereof.

A conventional floor ring 20 is installed in floor 10. Floor ring 20 has a center opening 22 which terminates in a downwardly extending sewer pipe 24. A conventional wax ring 26 is mounted on top of floor ring 20 and serves to seal toilet 12 to floor ring 20 when the installation is completed. Floor ring 20 is nested within recess 18 of base 14 of toilet 12.

Figure 4:
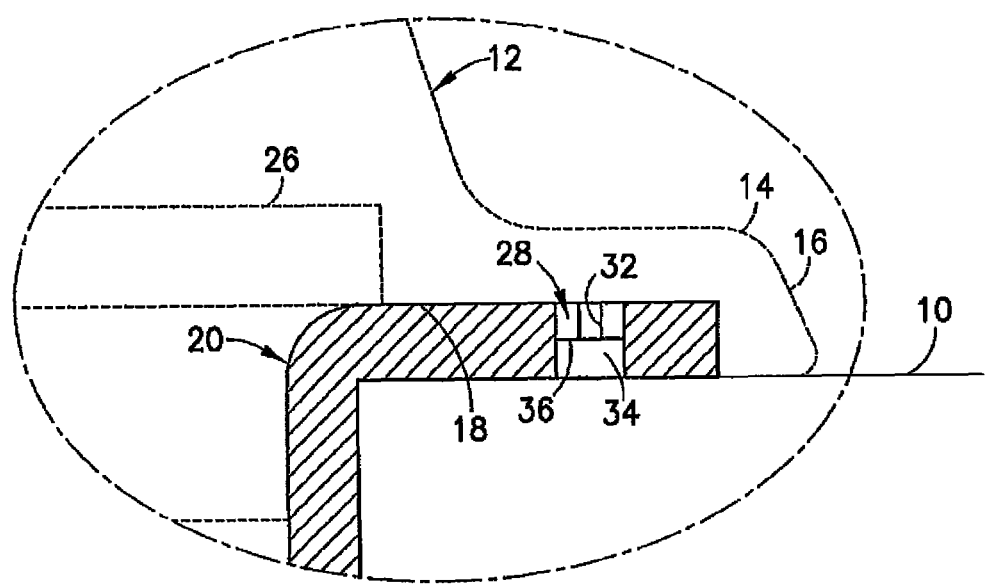
FIG. 4 is an enlarged scale sectional view taken on line 4-4 of FIG. 2 with the bolt removed.
Figure 5:
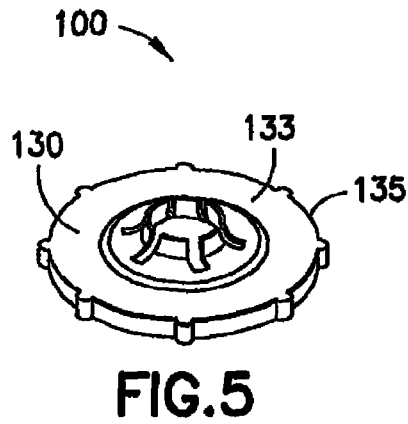
FIG. 5 is a top perspective view of an embodiment of a retaining ring.
Figure 6:
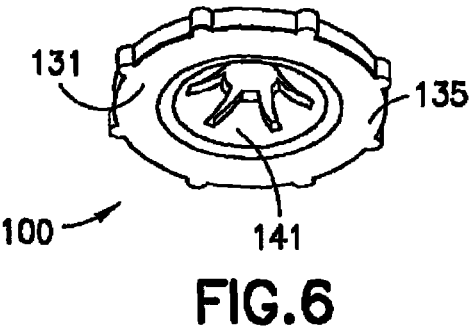
FIG. 6 is a bottom perspective view of the retaining ring of FIG. 5.
Figure 7:
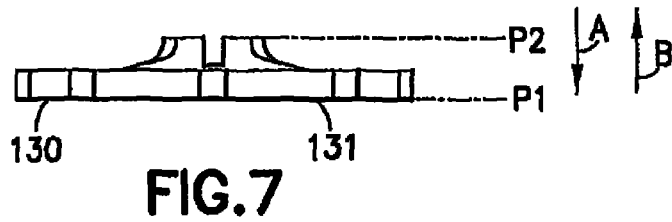
FIG. 7 is an elevational view of the retaining ring of FIG. 5.
Figure 8:
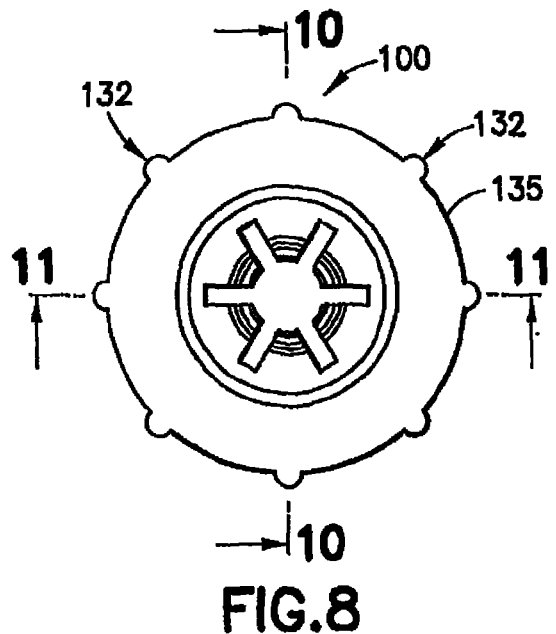
FIG. 8 is a top plan view of the retaining ring of FIG. 5.
Figure 9:
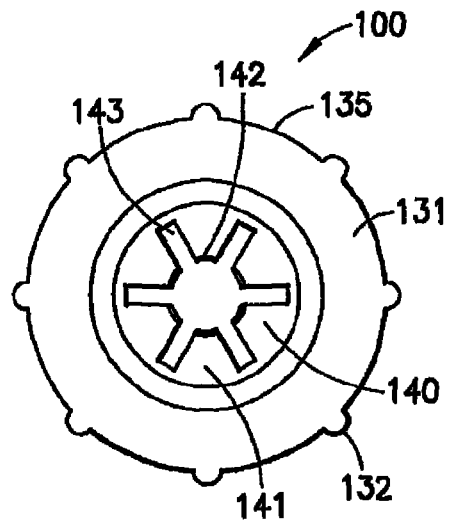
FIG. 9 is a bottom plan view of the retaining ring of FIG. 5.
Figure 10:
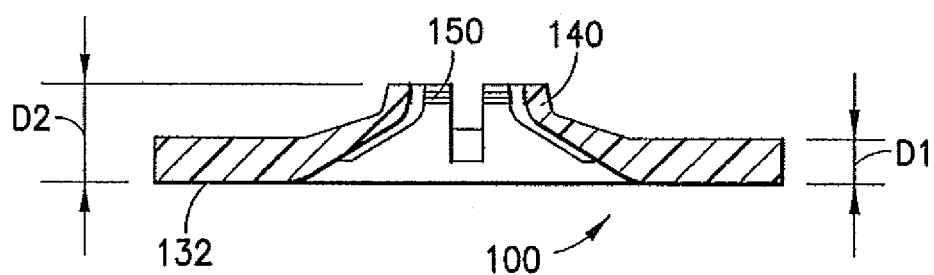
FIG. 10 is a sectional elevational view of the retainer of FIG. 8 taken along section line 10-10.
Figure 11:
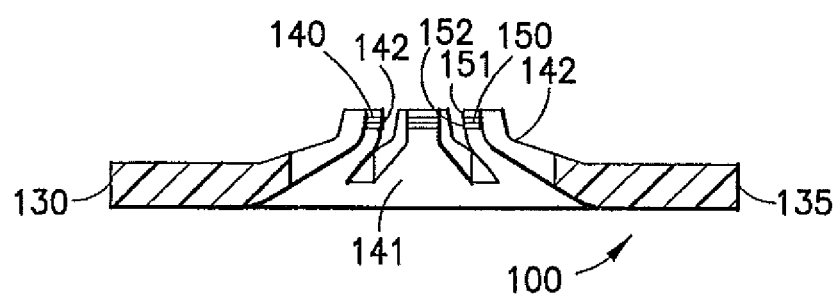
FIG. 11 is a sectional elevational view of the retainer of FIG. 8 taken along section line 11-11.

As shown in FIGS. 2, 3, 3A, and 4) a pair of elongated slots 28 are formed in ring 20. Slots 28 are comprised of a wide portion 30 which terminates in elongated narrow portion 32. As shown in FIG. 4, a groove 34 is formed underneath narrow portion 32 under a lower edge 36 of narrow portion 32.

Figure 1:
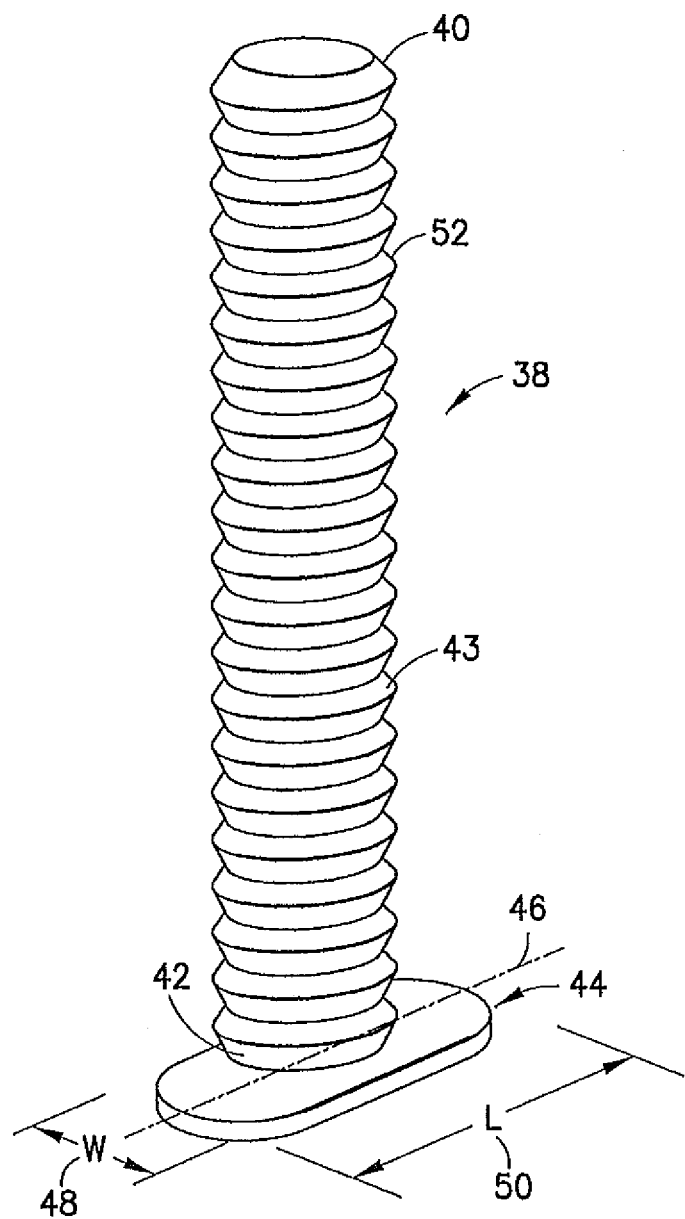
FIG. 1 is an enlarged perspective view of a conventional bolt for use with of this invention.
Figure 2:
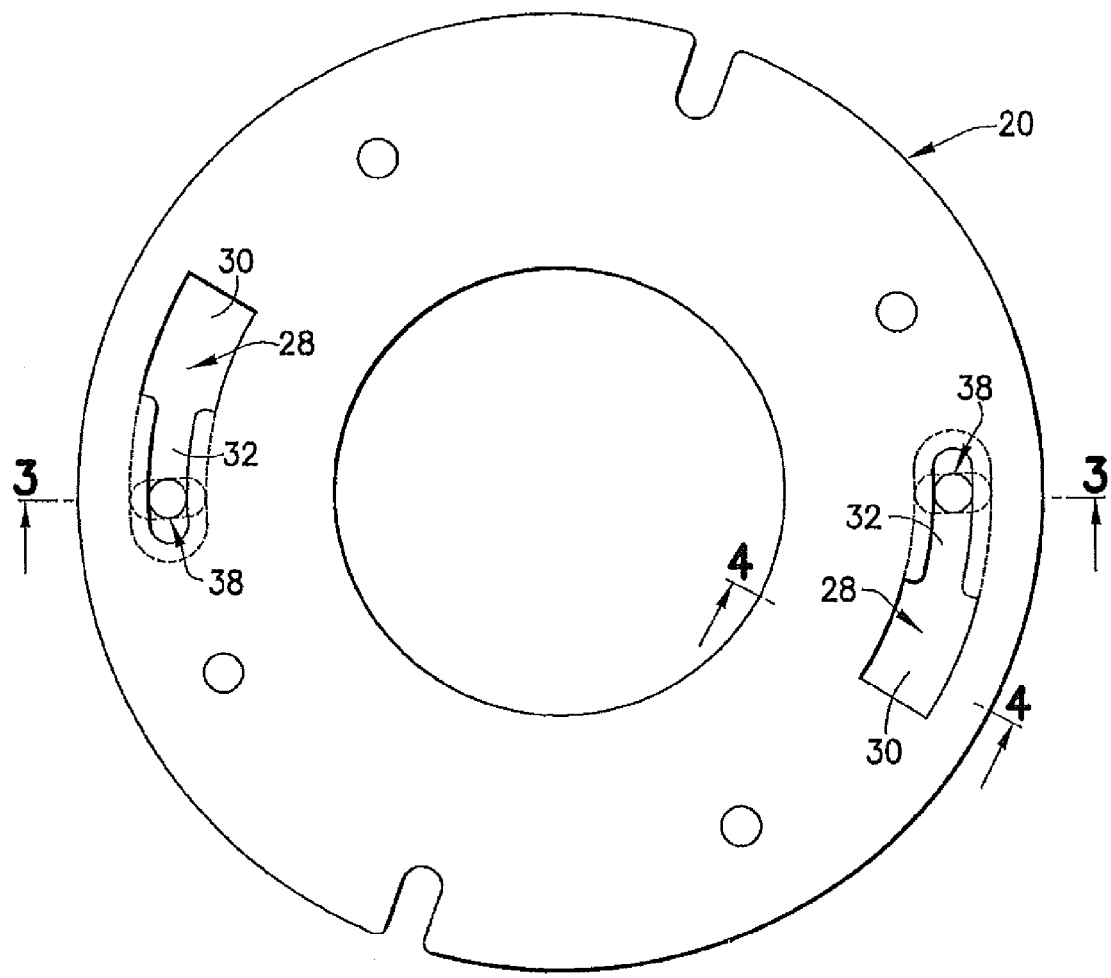
FIG. 2 is plan view of a conventional floor ring.

As shown in FIG. 1, a bolt 38 has an upper end 40 and a lower end 42. A planar head 44 is located on the lower end 42 and has a center axis 46. The width of head 44 is designated by W 48, and the length thereof is designated by the letter L 50. A threaded shank 52 extends from lower end 42 to upper end 40.

To install toilet 12, floor ring 20 is set in place in floor surface 10 with a bolt 48 extending upwardly from each of the slots 28. A nut 56 on each bolt is typically not installed on the upper ends of the bolts 38 at that point in time. Typically, heads 44 of bolts 38 are inserted into slots 28 through the wide portion 30 thereof, and can be moved into the narrow portions 32. Wax ring 26 is then located in its conventional position, and toilet 12 is thereupon lowered onto floor ring 20 so that bolts 38 can extend through bores 58 in the base of toilet 12. It is apparent how it is difficult to keep bolts 38 in place, so that a bore 38A in toilet 12 rides over bolts 38. However, a retainer 100' is useful to hold bolts 38 upright as the toilet is lowered.

A preferred example of a push down bolt retainer in accordance with a preferred embodiment of the invention is shown generally as retainer 100 in FIGS. 5-11.

Retainer 100 comprises a first base portion 130 and two or more fingers 140 extending inwards from first base portion 130. First base portion 130 includes a bottom surface 131 which will contact the top of the flange where the retaining bolt extends through a base in the toilet. Thus, the diameter of base 130 should be larger than the typical flange slot, which is generally 0.375 inches wide. The outer periphery of first base portion 130 should be thick and wide enough to be easy to turn by hand. Thus, raised nibs 132 are advantageously included. First base portion 130 should also be sturdy enough to provide effective strength. Generally, a thickness of 0.040 to 0.125 inches, preferably 0.075 to 0.085 inches and a width of 0.50 to 1.250 inches, preferably 1.175 to 1.185 inches is suitable.

Fingers 140 have a second base portion 141 where they extend from first base portion 130 and a tip portion 142, where they grip the threads of the retaining bolt, e.g., threads 42 of bolt 38, It is desired that retainer 100 can be pushed onto the retaining bolt and then snugged tight with minimal turning. Accordingly, fingers 140 advantageously incline up from bottom surface 131 in the direction from second base portion 141 to tip 142. Thus, second base portion 141 can act as a living hinge as fingers 140 are deflected upwards as retainer 100 is pushed down over a bolt. In another embodiment of the invention, fingers 140 are not inclined and rely on their flexibility and resiliency to permit retainer 100 to be pushed over a bolt. Consequently, retainer 100 is advantageously made of plastic, rubber or other plastic-like and rubber-like materials.

In order to permit deformation at tip 142, to permit retainer 100 to be pushed over a bolt, fingers 140 are advantageously wedge shaped and separated by slots 143.

It is also advantageous that tip portion 142 includes a bolt thread gripping section 150. An inwardly facing surface 151 of gripping section 150 can be threaded with one, two or more ridges 152 to grip the bolt threads. The plurality of inwardly facing surfaces 151 can define a hole for receiving the bolt shaft. Thus, after retainer 100 is pushed over the bolt, turning retainer 100 will force gripping section 150 downwards, imparting a downward force to bottom surface 131. Because gripping section 150 is on a plane raised above first base portion_130, tightening retainer 100 will force fingers 140 even closer toward the middle, increasing the force with which they grip the bolt. This will act to hold the bolt in place more securely, rather than deflecting it out of position. The inclined structure of fingers 140 serves to reduce wear on the inner threads.

Furthermore, because second base portion 141 may act as a living hinge as fingers 140 are deflected upwards, and because fingers 140 may each be deflected independently of the other fingers 140, retainer 100 may be used for stabilizing a variety of bolt sizes, such as, for example, size ¼-20 bolts (¼ inch diameter, 20 threads per inch), and size 5/16-18 bolts (5/16 inch diameter, 18 threads per inch).

Once retainer 100 is positioned proximate its final location on the bolt, retainer 100 may be rotated or twisted into place with ridges 150 on retainer 100 threadably mating with the threads on the bolt (not shown).

Moreover, the user does not have to rotate retainer 100 and thread it all the way down the length of the bolt, but may save time by pressing and sliding it into its final position, or a position close to its final position, before finally rotating retainer 100 into its final position by use of ridges 142.

Moreover, because gripping sections 150 are disposed in a second plane which is parallel to and spaced apart from the first plane (i.e., the base top 133 is disposed a first distance D1 along a center axis of retainer 100 from the base bottom 131 and the top of each of the plurality of fingers 140 is disposed a second distance D2 along the center axis from the base bottom 131, and the second distance D2 is greater than the first distance D1), the sliding of retainer 100 into its final or approximately its final position is facilitated. The preferred relationship of D1 and D2 is between 10:20 and 14:17, preferably 13:18.

In an exemplary embodiment, the fingers 140 may be symmetrically arranged about an axis. Fingers 140, however, need not be symmetrically arranged, and may be arranged in other alignments as a matter of design choice by one skilled in the art.

In an exemplary embodiment, ridges 152 may define at least one thread ridge arranged to define at least a portion of a helix, such that ridges 152 may suitably mate with the helical threads and grooves of a bolt (not shown).

Furthermore, in an exemplary embodiment, outer perimeter 135 of retainer 100 may be substantially circular. Outer perimeter 135 of retainer 100 may, however, be formed in alternate shapes such as, by way of non-limiting example, a substantially square shape, a substantially triangular shape, or other shapes as a matter of application specific design choice by one skilled in the art.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall there between. In particular, this invention should not be construed as being limited to the dimensions, proportions or arrangements disclosed herein.

The invention claimed is:

1. A retainer sized, constructed and arranged for retaining a bolt having a threaded shank, the retainer comprising:
    a first base portion having a bottom surface in a first plane; and
    a second base portion comprising a living hinge portion extending inwardly and upwardly from the first base portion and above the first plane, and
    more than two fingers extending in a continuously inclined upward and inward direction from the second base portion, each finger having a deformable tip section having at least one thread engaging ridge, each finger and deformable tip section disconnected separated from an adjacent finger and deformable tip section, the deformable tip sections being disposed in a second plane above the first plane and above the second base portion and together defining a bolt bore aperture sized to receive the threaded shank of the bolt, the fingers are constructed and arranged so that the thread engaging ridges on the deformable tip sections deflect in use upwardly and outwardly away from the threaded shank of the bolt when the retainer is pushed in a downward direction from the second plane towards the first plane over the threads of the threaded shank, and deflect in use downwardly and inwardly when the retainer is tightened by turning the retainer over the bolt.

2. The retainer according to claim 1, wherein at least one of the fingers is tapered in the direction extending from the second base portion to the deformable tip section.

3. The retainer according to claim 1, wherein the thread ridges are arranged to define at least a portion of a helix.

4. The retainer according to claim 1, wherein the perimeter of the base portion is substantially circular.

5. The retainer according to claim 1, wherein the retainer comprises a polymeric material.

6. The retainer according to claim 1, wherein the retainer is made of plastic.

7. The retainer of claim 6, the bolt bore aperture having a diameter substantially that of the diameter of the threaded shank.

8. The retainer of claim 1, wherein the bottom surface is substantially smooth.

9. An assembly for retaining a threaded bolt, the assembly comprising:
    a threaded bolt and a retainer, the retainer comprising:
        a first base portion having a central axis and a bottom surface in a first plane;
        a second base portion comprising a living hinge portion extending inwardly and upwardly from the first base portion and above the first plane, and
        a plurality of flexible fingers continuously extending inclinedly upwards and inwards from the second base portion and inwards towards the central axis, each of the plurality of flexible fingers separated from an adjacent flexible finger;
        each of the plurality of flexible fingers having a deformable gripping section, each of the deformable gripping sections having a thread dimensioned and disposed to threadingly engage the threaded bolt, and each deformable gripping section disconnected from an adjacent deformable gripping section;
        wherein each of the plurality of flexible fingers hingedly flex about the living hinge in a direction away from the first base portion when the retainer is being pushed over the threads of the threaded bolt, and when the retainer is tightened by rotating the retainer around the threaded bolt the flexible fingers flex inwardly to urge the deformable gripping sections towards and against the threaded bolt.

10. The assembly according to claim 9, further comprising a plurality of nibs disposed about a perimeter of the first base portion.

11. The assembly according to claim 9, wherein the plurality of flexible fingers are symmetrically arranged about the central axis.

12. The assembly of claim 9, wherein the retainer is formed of plastic.

13. The assembly of claim 9, wherein the first base portion comprises a substantially smooth bottom surface.

14. The assembly of claim 9, wherein at least one of the plurality of flexible fingers is tapered in the direction extending from the first base portion to the deformable gripping section.

* * * * *